United States Patent [19]
Wilkes et al.

[11] Patent Number: 5,255,506
[45] Date of Patent: Oct. 26, 1993

[54] SOLID FUEL COMBUSTION SYSTEM FOR GAS TURBINE ENGINE

[75] Inventors: Colin Wilkes, Lebanon; Hukam C. Mongia, Carmel, both of Ind.

[73] Assignee: General Motors Corporation, Detroit, Mich.

[21] Appl. No.: 796,959

[22] Filed: Nov. 25, 1991

[51] Int. Cl.$^5$ ............................................. F02C 3/28
[52] U.S. Cl. ................................. 60/39.12; 60/39.464; 60/732
[58] Field of Search ............... 60/39.06, 39.12, 39.464, 60/732, 733

[56] References Cited

U.S. PATENT DOCUMENTS

| | | | |
|---|---|---|---|
| 3,446,014 | 5/1969 | Foster-Pegg | 60/39.182 |
| 4,183,208 | 1/1980 | Horgan et al. | 60/39.12 |
| 4,387,561 | 6/1983 | Hamilton | 60/39.12 |
| 4,768,446 | 9/1988 | Wilkes et al. | 110/262 |
| 4,787,208 | 11/1988 | DeCorso | 60/723 |
| 4,802,445 | 2/1989 | Robertson | 60/39.12 |
| 4,896,497 | 1/1990 | Pillai | 60/39.12 |
| 4,909,030 | 3/1990 | Ishihara | 60/39.464 |
| 4,920,898 | 5/1990 | Solbes et al. | 110/265 |
| 4,958,488 | 9/1990 | Wilkes et al | 60/39.55 |
| 4,960,056 | 10/1990 | Pillsbury | 110/233 |
| 4,961,389 | 10/1990 | Pillsbury | 110/233 |

*Primary Examiner*—Louis J. Casaregola
*Attorney, Agent, or Firm*—Saul Schwartz

[57] ABSTRACT

A solid fuel, pressurized fluidized bed combustion system for a gas turbine engine includes a carbonizer outside of the engine for gasifying coal to a low Btu fuel gas in a first fraction of compressor discharge, a pressurized fluidized bed outside of the engine for combusting the char residue from the carbonizer in a second fraction of compressor discharge to produce low temperature vitiated air, and a fuel-rich, fuel-lean staged topping combustor inside the engine in a compressed air plenum thereof. Diversion of less than 100% of compressor discharge outside the engine minimizes the expense of fabricating and maintaining conduits for transferring high pressure and high temperature gas and incorporation of the topping combustor in the compressed air plenum of the engine minimizes the expense of modifying otherwise conventional gas turbine engines for solid fuel, pressurized fluidized bed combustion.

4 Claims, 3 Drawing Sheets

SOLID FUEL COMBUSTION SYSTEM FOR GAS TURBINE ENGINE

The invention herein described was made in the course of work under a contract or subcontract thereunder with the U.S. Department of Energy.

FIELD OF THE INVENTION

This invention relates to solid fuel, pressurized fluidized bed combustion systems for gas turbine engines.

BACKGROUND OF THE INVENTION

In basic solid fuel, pressurized fluidized bed (PFB) combustion systems for gas turbine engines of on the order of 50 megawatts and higher, vitiated air is produced by fluidizing or combusting coal in a pressure vessel outside the engine in 100% of the discharge of the compressor of the engine diverted outside of the case thereof to the PFB. The turbine inlet temperature of such PFB produced vitiated air is unacceptably low because the fluidized bed reaction temperature must be below the slagging temperature of coal, about 1600 degrees F. To increase the turbine inlet temperature of PFB produced vitiated air, systems have been proposed in which the vitiated air is further heated in a topping combustor outside the engine. In such systems, topping combustor fuel may be supplied separately or generated in a carbonizer in which coal is partially combusted in a portion of compressor discharge to produce combustible fuel gas. Char, the residue of the carbonizer, is suitable for further combustion in a PFB to produce the low temperature vitiated air which, in turn, is heated in the topping combustor to an acceptably high turbine inlet temperature. Such PFB systems, however, divert 100% of compressor discharge outside of the engine and are, therefore, burdened by high costs for fabricating and maintaining structure to contain and transfer large quantities of compressed air and high temperature vitiated air. In addition, major structural modifications are required in the engine to accommodate 100% diversion of compressor discharge. A solid fuel, PFB combustion system according to this invention minimizes costs by diverting less than 100% of compressor discharge outside the engine and by minimizing structural modifications in the engine.

SUMMARY OF THE ENGINE

This invention is a new and improved solid fuel, PFB combustion system for a gas turbine engine including a carbonizer and a PFB outside the engine and a rich-quench-lean (RQL) topping combustor in a compressed air plenum inside the engine. The gas turbine engine has a compressor which discharges into the compressed air plenum. A first fraction of compressor discharge is diverted outside the engine to the carbonizer and supports partial combustion of coal therein to produce low Btu fuel gas. A second fraction of compressor discharge is diverted outside the engine to the PFB and supports further combustion therein of char from the carbonizer to produce low temperature vitiated air. The temperature of the vitiated air is increased by combustion of the low Btu fuel gas in a rich zone of the RQL combustor at an equivalence ratio exceeding 1.0 to produce a continuous stream of higher temperature vitiated air and ultra-low Btu combustible gas. Combustion of low Btu gas in vitiated air from the PFB destroys the thermal NOx from the PFB and the fuel-bound nitrogen compounds in the low Btu gas. A third fraction of compressor discharge consisting of substantially the remainder thereof is retained within the engine and introduced into the hot gas stream down stream of the rich zone including into a quench zone and a lean zone of the RQL combustor and into a dilution zone downstream of the lean zone. The vitiated air and ultra-low Btu combustible gas are quenched in the quench zone. The temperature of the vitiated air is then raised again by combustion of the ultra-low Btu gas in the lean zone at an equivalence ratio of less than 1.0 to produce a continuous stream of high temperature vitiated air or hot gas motive fluid. The high temperature vitiated air is diluted in the dilution zone to a predetermined turbine inlet temperature.

DESCRIPTION OF PRIOR ART

Figure 1:
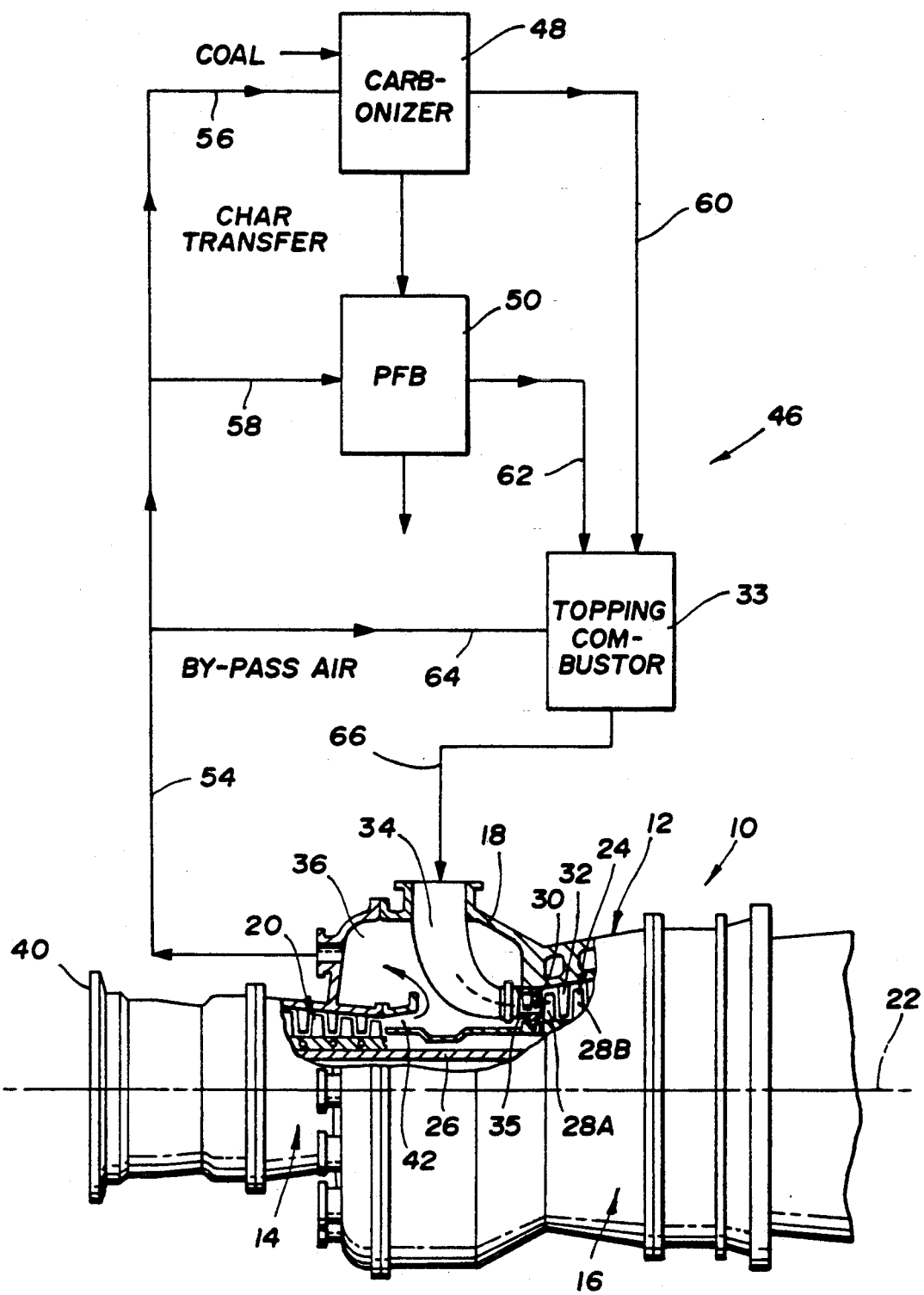
FIG. 1 is a partially broken-away view of a gas turbine engine having a schematically illustrated prior art solid fuel, PFB combustion system.

Referring to FIG. 1, a stationary gas turbine engine (10) includes an engine case (12) having a compressor section (14), a turbine section (16), and a pressure casing (18) therebetween. An axial flow compressor (20) is supported on the case (12) in the compressor section for rotation about a centerline (22) of the engine. An axial flow turbine (24) is supported on the case (12) in the turbine section (16) for rotation about the centerline (22) and is connected to the compressor (20) by a tubular rotor shaft (26). The turbine (24) has circumferential turbine blade stages (28A-B) thereon in an annular gas flow path (30) of the engine. The turbine blade stages (28A-B) are separated by annular stator vane stages (32) on the turbine section (16) of the engine case.

The pressure casing (18) is specially modified to accommodate 100% flow diversion outside of the engine (10) and return flow from a topping combustor (33) as hot gas. An internal transition piece (34) on the pressure casing collects the returning hot gas by means of single or multiple inlets and forms an annular duct at the inlet to an annular nozzle (35). A compressed air chamber (36) is defined inside the pressure casing (18) around the transition piece (34). Air enters the compressor (20) through an inlet end (40) of the case (12) and is discharged by the compressor through an annular diffuser (42) into the compressed air chamber (36). In a 50 megawatt engine, compressor discharge into the compressed air plenum may be about 385 lb/sec. The turbine nozzle (35) is supported on the turbine section (16) at the forward or upstream end of the gas flow path (30).

A solid fuel, PFB combustion system (46) includes a carbonizer (48), a pressurized fluidized bed (50), and the topping combustor (33) all of which may assume known configurations and which are, therefore, described only functionally. The carbonizer (48) is outside the engine case (12) and receives a continuous supply of coal. A conduit (54) connected to the compressed air chamber (36) diverts 100% of compressor discharge outside the engine. A first branch (56) from the conduit (54) diverts a first fraction of compressor discharge to the carbonizer (48). Coal in the carbonizer is partially combusted in the first fraction of compressor discharge to produce low Btu combustible fuel gas and solid char.

The PFB (50) is likewise outside the engine case (12) and receives a continuous supply of char from the carbonizer (48). A second fraction of compressor discharge is diverted to the PFB through a second branch (58) from the conduit (54). Char in the PFB is further combusted in the second fraction of compressor discharge to produce vitiated air at about 1600 degrees F., a temperature below the slagging temperature of the char in the PFB.

The topping combustor (33), also outside the engine case (12), is connected to the carbonizer (48) by a conduit (60), to the PFB (50) by a conduit (62), and to the conduit (54) by a third branch (64). A third or remaining fraction of compressor discharge is diverted to the topping combustor (52) through the third branch (64) and supports complete combustion of the low Btu gas from the carbonizer in the topping combustor (33) to increase the temperature of the vitiated air. A conduit (66) transfers the high temperature vitiated air to the transition piece (34). The transition piece (34) forces the high temperature air into the annular gas flow path (30) of the engine through the turbine nozzle (35).

DESCRIPTION OF A PREFERRED EMBODIMENT

Figure 2:
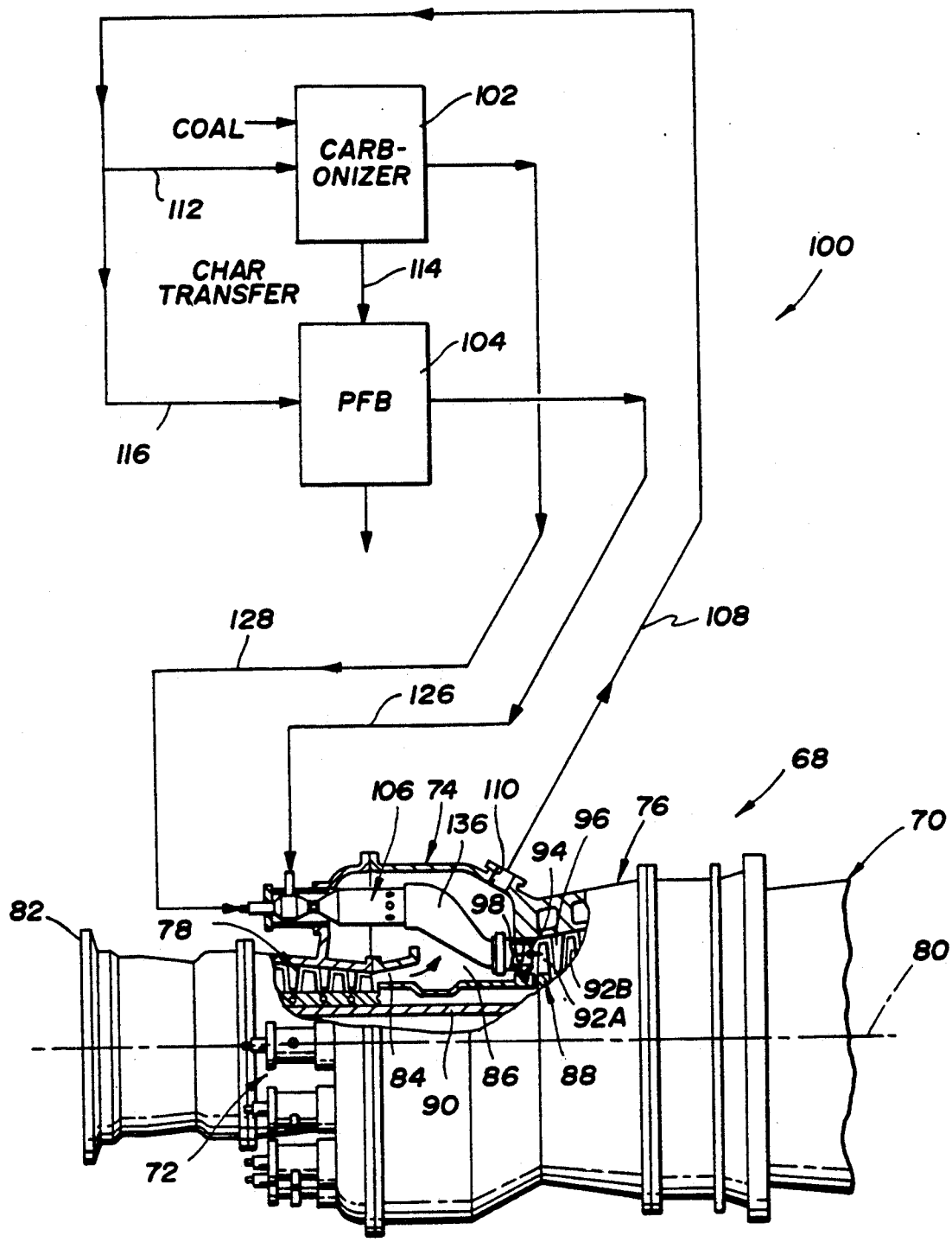
FIG. 2 is a partially broken-away view of a gas turbine engine having a schematically illustrated solid fuel, PFB combustion system according to this invention.
Figure 3:
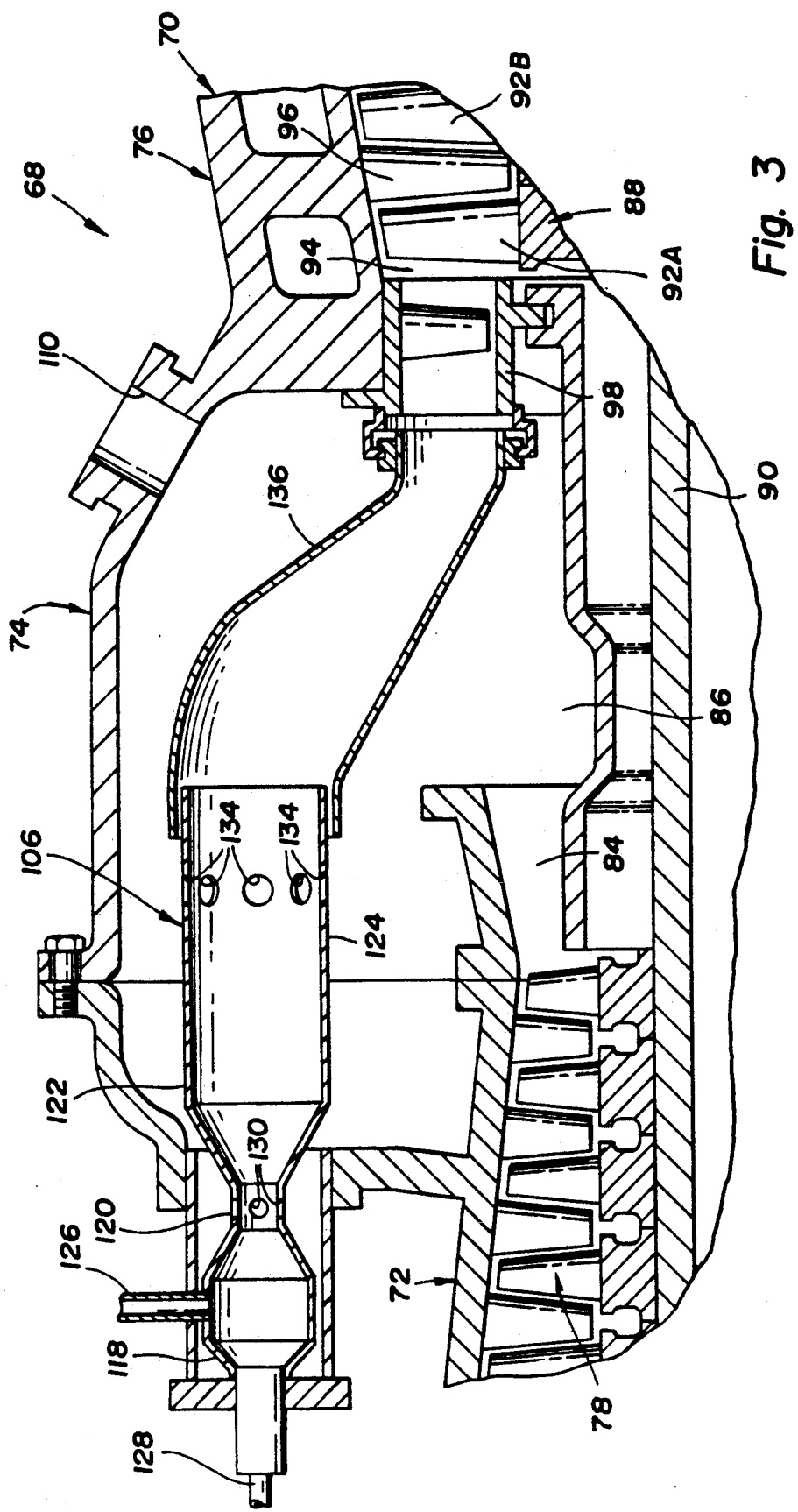
FIG. 3 is an enlarged view of a portion of FIG. 2.

Referring to FIGS. 2-3, a stationary gas turbine engine (68) includes an engine case (70) having a compressor section (72), a combustor section (74), and a turbine section (76). An axial flow compressor (78) is supported on the case (70) in the compressor section for rotation about a centerline (80) of the engine. Air enters the compressor (78) through an inlet end (82) of the case (70) and is discharged by the compressor through an annular diffuser (84) into an annular compressed air plenum (86) of the engine in the combustor section (74). In a 50 megawatt engine, compressor discharge into the compressed air plenum may be about 385 lb/sec.

An axial flow turbine (88) is supported on the case (70) in the turbine section (76) for rotation about the centerline (80) and is connected to the compressor (78) by a tubular rotor shaft (90). The turbine (88) has circumferential turbine blade stages (92A-B) thereon in an annular gas flow path (94) of the engine. The turbine blade stages (92A-B) are preceded by annular stator vane stages (96) on the turbine section (76) of the engine case. An annular turbine nozzle (98) is supported on the turbine section (76) at the forward or upstream end of the gas flow path (94).

A solid fuel, PFB combustion system (100) according to this invention includes a carbonizer (102) and a PFB (104) outside of the engine case (70) and a plurality of RQL combustors (106) inside the engine case in the compressed air plenum (86). The compressed air plenum (86) is structurally similar to compressed air plenums of conventional gas turbine engines and the RQL combustors (106) may be like the RQL combustor described in U.S. Pat. No. 4,787,208, issued 29 Nov. 1988.

The carbonizer (102) and the PFB (104) may assume known configurations and are, therefore, described only functionally. The carbonizer (102) is outside the engine case (70) and receives a continuous supply of coal. A conduit (108) is connected to a port (110) in the combustor section (74) of the engine case for diversion of some compressor discharge from the compressed air plenum. A first branch (112) from the conduit (108) diverts a first fraction of on the order of 15 percent of compressor discharge to the carbonizer (102). Coal in the carbonizer is partially combusted in the first fraction of compressor discharge to produce high BTU combustible fuel gas.

The residue of partial combustion in the carbonizer, char, is introduced into the PFB (104) through a conduit (114). A second branch (116) from the conduit (108) diverts a second fraction of on the order of 35 percent of compressor discharge to the PFB (104). Char in the PFB is further combusted in the second fraction of compressor discharge to produce vitiated air at about 1600 degrees F., a temperature below the slagging temperature of the char in the PFB.

The RQL combustor (106) includes, in serial flow relationship, a rich zone (118), a quench zone (120), a lean zone (122), and a dilution zone (124) all housed generally within the compressed air plenum (86). Low temperature vitiated air is transferred from the PFB (104) to the rich zone (118) through a conduit (126). Low Btu fuel gas having a heating value of about 100-150 Btu/scft is transferred from the carbonizer to the rich zone (118) through a conduit (128). The fuel gas autoignites in the rich zone in the low temperature vitiated air which then supports partial combustion of the fuel gas at an equivalence ratio exceeding 1.0 to produce a continuous stream of a mixture of higher temperature vitiated air and ultra-low Btu combustible gas having a heating value of about 20-50 Btu/scft.

The mixture of vitiated air and ultra-low Btu gas discharges through the quench zone (120) into the lean zone (122). A third fraction of compressor discharge consisting of substantially the remainder thereof is retained within the compressed air plenum (86) and is introduced into the RQL combustor and the dilution zone downstream of the rich zone (118). One part of the third fraction of compressor discharge is introduced as radial jets through a plurality of schematically represented orifices (130) in the quench zone (120). The air introduced in the quench zone mixes with the vitiated air and ultra-low Btu gas which auto-ignites. The compressed air entering through the quench air inlet holes (130) supports complete combustion of the ultra-low Btu gas in the lean zone at an equivalence ratio of less than 1.0. Combustion is completed in the lean zone at a temperature of about 2400 degrees F.

The high temperature vitiated air or hot gas motive fluid produced in the lean zone (122) traverses the dilution zone (124) immediately downstream of the combustion reaction in the lean zone. The remainder of compressor discharge is introduced into the dilution zone through a plurality of dilution air holes (134), FIG. 3. Air entering the dilution zone (124) through the holes (134) reduces the temperature of the hot gas motive fluid to a predetermined turbine inlet temperature of about 1900 to 2300 degrees F. The diluted hot gas motive fluid is transferred from the dilution zone to the turbine nozzle (98) through a transition tube (136). The turbine nozzle (98) directs the diluted hot gas motive fluid from the transition tubes of each of the RQL combustors (106) into the annular flow path (94) of the engine.

Importantly, the first and second fractions of compressor discharge diverted outside the engine case represent less than the 100% diversion of compressor discharge characteristic of prior art solid fuel, PFB combustion systems for gas turbine engines. Since less than 100% of compressor discharge flows externally, the physical dimensions and fabrication and maintenance costs of conduits and the like, such as the conduits (108)(116)(126), are proportionally less than for corresponding apparatus in systems characterized by 100% diversion of compressor discharge. Also, since the RQL combustors (106) are structurally similar to corresponding elements of prior internal combustion systems for gas turbine engines, only relatively minor, and therefore economical, modifications to such conventional gas turbine engines are required to adapt the same for solid fuel, PFB combustion.

Prior art does not describe topping combustors in which NOx emissions from the PFB are to be controlled. It is well known that PFB's produce thermal NOx emissions at significantly higher levels than conventionally fueled gas turbines. This thermal NOx will add substantially to the small amount of thermal NOx produced in the topping combustor unless special precautions are taken. In addition, fuel-rich, fuel-lean staging is required to control the release of fuel bound nitrogen compounds in the low Btu carbonizer fuel in the form of NOx emissions. In the topping combustor described here, the low Btu fuel gas is mixed with all or most of the PFB gas in the rich zone where partial combustion takes place. During the fuel-rich combustion process, a significant fraction of both the thermal NOx from the PFB and the fuel bound nitrogen from the low Btu fuel are destroyed to form molecular nitrogen, N2. NOx emissions from the topping combustor are therefore limited to the residual NOx leaving the rich zone and the small amount of thermal NOx generated in the lean zone. This thermal NOx is minimized by limiting the maximum temperature in the lean zone.

We claim:

1. In a gas turbine engine including
   an engine case having a compressed air plenum therein,
   a compressor rotatable about an axis of said engine case and discharging compressed air into said compressed air plenum, and
   a turbine rotatable as a unit with said compressor and including a circumferential turbine blade stage in an annular gas flow path of said engine case,
   a solid fuel, pressurized fluidized bed combustion system comprising:
   a first conduit means connected to said engine case for transferring therefrom a first fraction of compressor discharge,
   a second conduit means connected to said engine case for transferring therefrom a second fraction of compressor discharge,
   a carbonizer means outside of said engine case connected to a supply of coal and to said first conduit means operative to produce from partial combustion of said coal in said first fraction of compressor discharge a continuous stream of low Btu combustible fuel gas and a residue of combustible solid char,
   a pressurized fluidized bed means outside of said engine case receiving said char from said carbonizer means and connected to said second conduit means operative to produce from further combustion of said char in said second fraction of compressor discharge a continuous stream of vitiated air at a temperature not exceeding the slagging temperature of said char,
   a topping combustor means inside said engine case in said compressed air plenum,
   a third conduit means between said pressurized fluidized bed means and said topping combustor for introducing said continuous stream of vitiated air into said topping combustor,
   a fourth conduit means between said topping combustor means and said carbonizer means for introducing said continuous stream of low Btu combustible fuel gas into said topping combustor,
   air inlet means on said topping combustor for introducing compressed air from said compressed air plenum into said topping combustor for supporting complete combustion of said low Btu fuel gas in said topping combustor to increase the temperature of said continuous stream of vitiated air to above the slagging temperature of said char, and
   transition tube means for transferring said higher temperature vitiated air from said topping combustor to said annular gas flow path of said engine.

2. In a gas turbine engine including
   an engine case having a compressed air plenum therein,
   a compressor rotatable about an axis of said engine case and discharging compressed air into said compressed air plenum, and
   a turbine rotatable as a unit with said compressor and including a circumferential turbine blade stage in an annular gas flow path of said engine case,
   a solid fuel, pressurized fluidized bed combustion system comprising:
   a first conduit means connected to said engine case for transferring therefrom a first fraction of compressor discharge,
   a second conduit means connected to said engine case for transferring therefrom a second fraction of compressor discharge,
   a carbonizer means outside of said engine case connected to a supply of coal and to said first conduit means operative to produce from partial combustion of said coal in said first fraction of compressor discharge a continuous stream of low Btu combustible fuel gas and a residue of combustible solid char,
   a pressurized fluidized bed means outside of said engine case receiving said char from said carbonizer means and connected to said second conduit means operative to produce from further combustion of said char in said second fraction of compressor discharge a continuous stream of vitiated air at a temperature not exceeding the slagging temperature of said char,
   a topping combustor means inside said engine case in said compressed air plenum including in serial connection a rich zone and a quench zone and a lean zone,
   a third conduit means between said pressurized fluidized bed means and said rich zone for introducing said continuous stream of vitiated air into said rich zone,
   a fourth conduit means between said topping combustor means and said rich zone for introducing said continuous stream of low Btu combustible fuel gas into said rich zone for partial combustion in said said continuous stream of vitiated air at an equivalence ratio exceeding 1.0 to produce a continuous stream of ultra-low Btu combustible gas at a temperature above the slagging temperature of said char, quench air inlet means in said topping combustor for introducing compressed air from said compressed air plenum into said quench zone to quench said continuous stream of ultra-low Btu combustible gas and to support complete combustion of said ultra-low BTU fuel gas in said lean zone at an equivalence ratio of less than 1.0 whereby the temperature of said continuous stream of vitiated air is increased to above the slagging temperature of said char, and transition tube means for transferring said higher temperature vitiated air from said lean zone to said annular gas flow path of said engine.

3. The solid fuel, pressurized fluidized bed combustion system recited in claim 2 and further including:

means defining a dilution zone in said topping combustor between said lean zone and said transition tube means, and dilution air inlet means on said topping combustor for introducing compressed air from said compressed air plenum into said dilution zone thereby to reduce the temperature of said continuous stream of higher temperature vitiated air to a predetermined turbine inlet temperature.

4. The solid fuel, pressurized fluidized bed combustion system recited in claim 3 wherein each of said first conduit means and said second conduit means is connected to said compressed air plenum so that each of said first and said second fractions of compressor discharge is diverted from said compressed air plenum.

* * * * *